(12) United States Patent
Surijan et al.

(10) Patent No.: US 7,786,769 B2
(45) Date of Patent: Aug. 31, 2010

(54) ON DIE SIGNAL DETECTOR WITHOUT DIE POWER

(75) Inventors: Einat Surijan, Netanya (IL); Hemi Brann, Shomron (IL); Saba Rushdy, Haifa (IL)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 11/591,331

(22) Filed: Nov. 1, 2006

(65) Prior Publication Data

US 2008/0136036 A1    Jun. 12, 2008

(51) Int. Cl.
*H03L 7/00* (2006.01)
(52) U.S. Cl. .................. 327/142; 327/143; 327/198
(58) Field of Classification Search .......... None
See application file for complete search history.

(56) References Cited

U.S. PATENT DOCUMENTS

| 4,321,489 A * | 3/1982 | Higuchi et al. ........ 327/76 |
| 5,731,720 A * | 3/1998 | Suzuki et al. ........ 327/77 |
| 6,529,067 B2 * | 3/2003 | Uen et al. ........ 327/544 |

* cited by examiner

*Primary Examiner*—An T Luu
(74) *Attorney, Agent, or Firm*—Ryder, Lu, Mazzeo and Konieczny, LLC; Douglas J. Ryder

(57) ABSTRACT

In general, in one aspect, the disclosure describes an apparatus having on die circuitry coupled to at least one input port to receive a signal. A resistor is coupled to the on die circuitry and an off die power supply When a signal of sufficient amplitude is received by the on die circuitry the on die circuitry enables current to flow through the resister and reduces the voltage applied to the on die circuitry via the resister.

17 Claims, 3 Drawing Sheets

ON DIE SIGNAL DETECTOR WITHOUT DIE POWER

BACKGROUND

Various electronic devices (e.g., input/output processors) receive data and process the data in some fashion. The electronic devices require power to perform their operations. When the electronic devices are not receiving signals they may be put in a sleep or deep sleep mode where some or all of the power sources are turned off in order to conserve power. When a signal is detected the electronic devices may come out of the sleep or deep sleep mode. The circuitry to detect the signal may be located on the board and may include capacitors, resistors and a comparator. Once the signal is detected the board may provide the various power sources to the electronic devices so that the electronic devices can process the incoming data.

Implementing signal detect circuitry on the electronic device die may reduce the number of board components and thus save money. However, implementing signal detect circuitry on the die requires power for the circuitry which reduces the effect of putting the circuit in sleep or deep sleep mode to save power.

BRIEF DESCRIPTION OF THE DRAWINGS

The features and advantages of the various embodiments will become apparent from the following detailed description in which.

DETAILED DESCRIPTION

Figure 1:
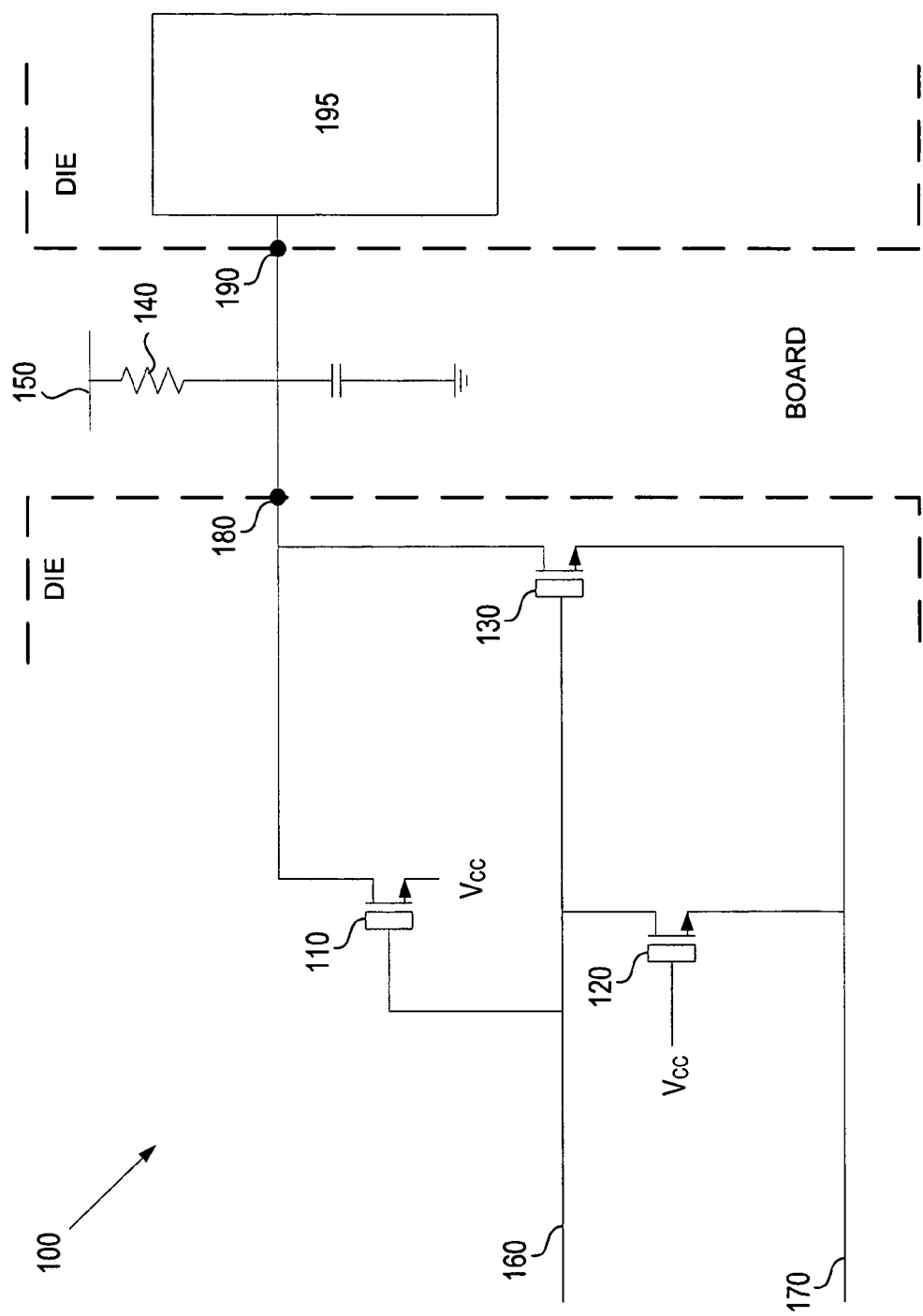
FIG. 1 illustrates an example signal detect circuit implemented substantially on the die without requiring any power supply on the die, according to one embodiment.

FIG. 1 illustrates an example signal detect circuit 100 that is part of an electronic device and is implemented substantially on the die without requiring any power supply on the die. When used hereinafter electronic device will include the signal detect device 100. The signal detect circuit 100 is utilized when the electronic device is in sleep or deep sleep mode (hereinafter simply referred to as sleep mode). When the signal detect circuit 100 detects a signal the electronic device is taken out of sleep mode and power is provided to the electronic device.

The signal detect circuit 100 includes transistors 110, 120, 130 on the die and a pull-up resistor 140 on the board. The circuitry on the die (transistors 110, 120, 130) is connected to the power supply 150 on the board via the resistor 140. The signal detect circuit 100 receives a differential input signal with a first leg (e.g., input +) being received at a first (e.g., positive) input terminal 160 and a second leg (e.g., input −) being received at a second (e.g., negative) input terminal 170. The output 180 of the signal detect circuit is the energy detected at the resistor 140. The output 180 is connected to an input 190 of a core circuit 195 on the die.

The core circuit 195 may put the electronic device in sleep mode. The core circuit 195 may put the electronic device in sleep mode in various different manners which will not be described in detail here but are within the scope of the various embodiments described herein. For example, the core circuit 195 may gate application of power to the electronic device or may initiate a gating signal that is used by the electronic device to turn the power off thereto. The core circuit 195 may remove the electronic device from sleep mode (e.g., application of power to the electronic device) based on the output 180 (energy detected by) of the energy detect circuit 100.

The source of the first transistor 110 and the gate of the second transistor 120 are connected to a power source ($V_{CC}$). When the circuit 100 is in sleep mode the $V_{CC}$ will be off and the source of the first transistor 110 and the gate of the second transistor 120 will in effect be connected to ground (0V). The drain of the first transistor 110 and the third transistor 130 is tied to the voltage source on the board via the resister 140. The first input terminal 160 is connected to the gate of the first transistor 110 and the third transistor 130, and the drain of the second transistor 120. The second input terminal 170 is connected to the source of the second transistor 120 and the third transistor 130.

When the circuit 100 is in sleep mode and no signal (or only noise) is received all of the transistors 110, 120, 130 will be off (open switch) so no current will flow through the resister 140 and the energy detected by the circuit (output 180) will be the power supply voltage. Accordingly, the electronic circuit 195 will not wake the electronic device from deep sleep mode.

When a low amplitude signal is received the third transistor 130 will turn on because it is receiving both legs (e.g., positive and negative) of the differential signal and the overall differential voltage is sufficient to turn the transistor 130 on (closed switch). The first and second transistors 110, 120 will remain off because they are only receiving a single leg (e.g., positive for transistor 110 and negative for transistor 120) of the differential signal and ½ of the overall differential voltage is not enough to turn on the transistors 110, 120). Accordingly, the resister 140 is connected to the second input terminal 170 which is less than 0V (negative portion of differential signal). Current flows through the resistor 140 and the voltage detected (the output 180) is less than 0V. A negative voltage is not desirable but may be acceptable for a low amplitude signal (e.g., $\geq -0.3V$).

The voltage detected (less than 0V) is provided to the input 190 of the core circuit 195 and the core circuit 195 may power the electronic device (remove from sleep mode) based thereon.

As the amplitude of the differential signal increases, half of the differential voltage will be enough to turn the first and second transistors 110, 120 on. The second transistor 120 turning on will act to short the gate and source terminals of the third transistor 130 and cause the third transistor 130 to turn off. Accordingly, the resistor 140 will be connected to the source of the first transistor 110 which is ground when the circuit is in deep sleep mode. Current flows through the resistor 140 and the voltage detected (the output 180) is 0V (ground).

The voltage detected (0V) is provided to the input 190 of the core circuit 195 and the core circuit 195 may power the electronic device (remove from sleep mode) based thereon.

It should be noted that FIG. 1 was described with respect to the positive input terminal 160 receiving a positive edge of the differential signal and the negative input terminal 170 receiving the negative edge of the signal. As this will not be the case, a second signal detect circuit may be used that is the same as the first signal detect signal except that the connection of the differential signal is switched (e.g., the first leg (input +) is received at the second (e.g., negative) input terminal 170 and the second leg (e.g., input −) is received at the first (e.g., positive) input terminal 160. This ensures that a differential signal will be detected regardless of whether the first or second leg of the signal is positive relative to the other.

Figure 2:
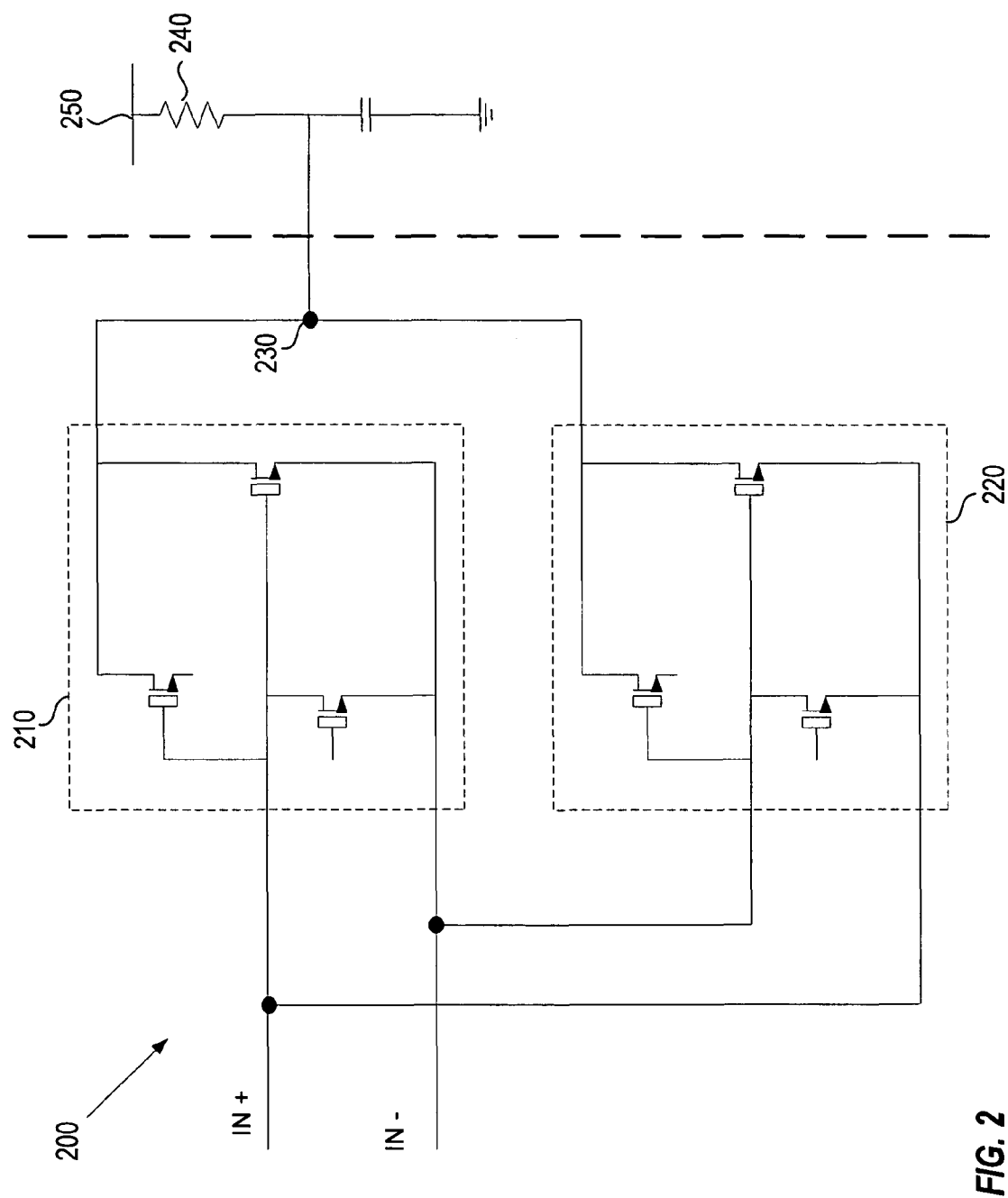
FIG. 2 illustrates an example signal detect circuit having positive and negative detect portions, according to one embodiment.

FIG. 2 illustrates an example signal detect circuit 200 having a positive 210 and negative detect 220 portion. The circuit 200 receives a differential signal (IN+ and IN−) and the differential signal is applied to different ports for the positive detect portion 210 and the negative detect portion 220. For the positive detect portion 210 the IN+ signal is applied to the positive port (e.g., 160 of FIG. 1) and the IN− signal is applied to the negative port (e.g., 170). For the negative detect portion 220 the IN + signal is applied to the negative port and the IN− signal is applied to the positive port. The positive detect portion 210 and the negative detect portion 220 are coupled together 230 and connected to the board resistor 240 (e.g., 140 of FIG. 1) that is connected to the board power supply 250 (e.g., 150).

When the electronic device is not in sleep mode the signal detect circuit (e.g., 100, 200) will have active power sources. Accordingly, the input to the source of the first transistor 110 and the gate of the second transistor 120 will be $V_{CC}$ (one supply voltage of the electronic circuit). Circuitry may need to be added to turn these transistors off when the signal detect circuit is powered.

Figure 3:
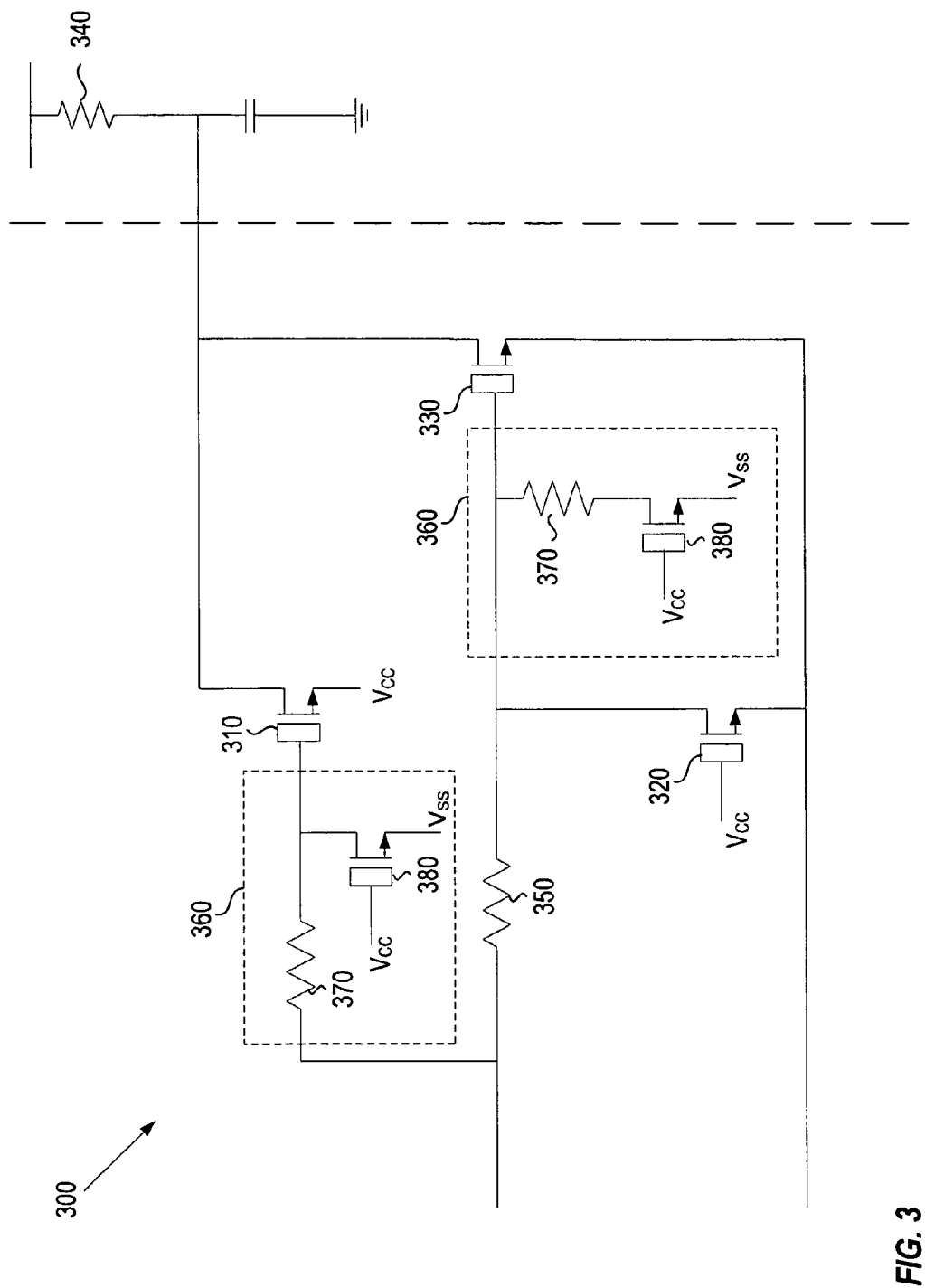
FIG. 3 illustrates an example signal detect circuit, according to one embodiment.

FIG. 3 illustrates an example signal detect circuit 300. The circuit includes transistors 310, 320, 330 on the die and resister 340 on the board. The circuit 300 also includes resistor 350 and power down circuits 360 coupled to the transistors 310, 330. The power down circuits 360 include a resistor 370 and a transistor 380. When the circuit 300 is powered the transistors 380 will be turned on so that current flows and low voltage is applied to the gates of transistor 310, 330 and they are turned off. That is, when the circuit 300 is powered on the energy measurement will be equal to the board power supply regardless of the signal received.

By way of example, if the electronic device implementing the signal detect circuit (e.g., 100) was an Ethernet I/O controller hub, the signal received at the inputs (e.g., 160, 170) would be the differential media dependent interface signals (MDIA+, MDIA−). The media access control (MAC) may determine when to place the physical interface transceiver (PHY) in a deep smart power down (DSPD) mode. The DSPD mode is entered automatically once the power supplies (e.g., 1.0V and 1.8V) are powered down by the MAC. The DSPD mode reduces the PHY power when the link is lost by moving all circuits into low power operating mode and powering down all power supplies (e.g., 1.1V, 1.8V and 3.3V). The MAC may determine when to take the PHY out of the DSPD mode. However, the PHY must still be able to detect link pulses (e.g., MDIA+, MDIA− signals) and wake up to engage in link negotiation. The goal of the energy detect block is to identify energy on the twisted pair and accordingly wake up from the DSPD mode in order to start negotiate with the link partner. The energy detect block may require a 3.3V power supply connection only to external pull-up resistor. When in DSPD mode the energy detect may consume substantially no power (e.g., less than 0.1 mW).

For the Ethernet I/O controller hub a signal having an amplitude less 250 mV (an amplitude below 50 mV may be considered noise) may not initiate the energy detect circuit. Accordingly, the energy detect circuit would not detect the signal and the output (e.g., 180) would remain in high level (the 3.3 V power source). For low amplitude signals (e.g., between 250-500 mV) the third transistor (e.g., 130, 330) of the energy detect circuit may turn on and the signal will be detected and the output voltage may be less than 0V. For high amplitude signals (e.g., above 500 mV) the first and second transistors (e.g., 110, 120) are turned on so that the signal is detected and the output voltage is 0V.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising
a semiconductor die having an on die signal detect circuit and core circuitry, wherein an output of the on die signal detect circuit is coupled to an input of the core circuitry, wherein the on die signal detect circuit includes at least one input port to receive an input signal, wherein the semiconductor die consumes substantially no power when the core circuitry is in a sleep mode; and
an off die resistor coupled to an off die power supply and between the output of the on die signal detect circuit and the input of the core circuitry, wherein when the core circuitry is in sleep mode substantially no current flows through the resister and an input voltage provided to the input of the core circuitry is a voltage from the off die power supply, and wherein when the on die signal detect circuit receives the input signal having sufficient amplitude the output of the on die signal detect circuit enables current to flow through the resister and reduces the input voltage provided to the input of the core circuitry and the reduced input voltage causes the core circuitry to wake from the sleep mode.

2. An apparatus comprising
on die circuitry coupled to two input ports to receive a differential signal, wherein the on die circuitry consumes substantially no power when in sleep mode; and
a resistor coupled to the on die circuitry and an off die power supply, wherein when the differential signal having sufficient amplitude is received by the on die circuitry the on die circuitry enables current to flow through the resister and reduces the voltage detected on the resister by the on die circuitry.

3. The apparatus of claim 1, wherein the on die signal detect circuit includes
two input ports to receive a differential input signal;
a first transistor having a gate coupled to a first leg of the differential input signal and a source coupled to a power supply node;
a second transistor having a gate couple to the power supply node and a source coupled to a second leg of the differential input signal; and
a third transistor having a gate coupled to the first leg of the differential input signal and a source coupled to the second leg of the differential input signal.

4. The apparatus of claim 3, wherein the power supply node is off when the core circuitry is in the sleep mode.

5. The apparatus of claim 3, wherein
the third transistor will turn on for low amplitude signals; and
the first transistor and the second transistor will turn on for high amplitude signals.

6. The apparatus of claim 3, wherein
the third transistor will turn on for high amplitude signals; and
the first transistor and the second transistor will turn on for low amplitude signals.

7. The apparatus of claim 3, wherein the on die signal detect circuit further includes power down circuitry coupled to the first transistor and the third transistor to turn the first transistor and the third transistor off when the apparatus is powered on.

8. The apparatus of claim 7, wherein the power down circuitry includes a transistor and a resister.

9. The apparatus of claim 2, wherein the one die circuitry includes at least one transistor that is turned on when the differential signal having sufficient amplitude is received enabling current to flow.

10. The apparatus of claim 2, wherein the on die circuitry includes a transistor to receive both legs of the differential signal and when the differential signal has a sufficient amplitude to connect the resister to a low voltage leg of the differential signal.

11. The apparatus of claim 2, wherein the on die circuitry includes a transistor to receive a high voltage leg of the differential signal and when the high voltage leg of the differential signal has a sufficient amplitude to connect the resister to ground.

12. The apparatus of claim 2, wherein the on die circuitry includes a first transistor having a gate coupled to first leg of the differential signal and a source coupled to a power supply node;
a second transistor having a gate couple to the power supply node and a source coupled to a second leg of the differential signal; and
a third transistor having a gate coupled to the first leg of the differential signal and a source coupled to the second leg of the differential signal.

13. The apparatus of claim 12, wherein the power supply node is off when the apparatus is in sleep mode.

14. The apparatus of claim 12, wherein
the third transistor will turn on for low amplitude signals; and
the first transistor and the second transistor will turn on for high amplitude signals.

15. The apparatus of claim 12, further comprising power down circuitry coupled to the first transistor and the third transistor to turn the first transistor and the third transistor off when the apparatus is powered on.

16. The apparatus of claim 15, wherein the power down circuitry includes a transistor and a resister.

17. An apparatus comprising
on die circuitry coupled to at least one input port to receive a signal, wherein the on die circuitry consumes substantially no power when in sleep mode;
a resistor coupled to the on die circuitry and an off die power supply, wherein when the signal received by the on die circuitry has a sufficient amplitude the on die circuitry enables current to flow through the resister and reduces the voltage detected on the resister by the on die circuitry; and
media access control (MAC) circuitry, wherein the on die circuitry is included in a physical interface transceiver (PHY) coupled to the MAC circuitry, and wherein the MAC circuitry initiates powering of the PHY circuitry when the on die circuitry detects the signal having sufficient amplitude.

* * * * *